United States Patent
Sun

(10) Patent No.: US 6,179,533 B1
(45) Date of Patent: Jan. 30, 2001

(54) DEVICE FOR CLAMPING A KNIFE OF A MACHINE CENTER

(76) Inventor: Ho Wei Sun, No. 20, Alley 28, Lane 851, Chung Shan Road, Shen Kang Hsiang, Taichung Hsien (TW)

(*) Notice: Under 35 U.S.C. 154(b), the term of this patent shall be extended for 0 days.

(21) Appl. No.: 09/478,476

(22) Filed: Jan. 6, 2000

(51) Int. Cl.[7] .............................. B23C 5/26; B23B 31/10
(52) U.S. Cl. ........................ 409/233; 279/50; 279/900
(58) Field of Search ..................... 409/233; 408/239 R, 408/240; 279/900, 50; B23B 5/26, 31/20

(56) References Cited

U.S. PATENT DOCUMENTS

| | | | |
|---|---|---|---|
| Re. 26,623 | * 7/1969 | Erikson | 409/233 |
| 2,565,330 | * 8/1951 | Sundt | 279/51 |
| 3,595,519 | * 7/1971 | Girola | 409/129 |
| 4,172,683 | * 10/1979 | Shimajiri et al. | 408/239 A |
| 4,196,501 | * 4/1980 | Shimajiri et al. | 409/233 |
| 4,704,056 | * 11/1987 | Babel | 409/233 |
| 4,817,267 | * 4/1989 | Hitomi | 409/233 |
| 4,873,756 | * 10/1989 | Yamane et al. | 29/568 |
| 4,986,704 | * 1/1991 | Narushima et al. | 409/233 |
| 4,997,325 | * 3/1991 | Heel et al. | 409/233 |
| 5,067,735 | * 11/1991 | Ronzoni | 279/50 |
| 5,070,592 | * 12/1991 | Sugata | 409/233 |
| 5,524,909 | * 6/1996 | Wyatt | 279/50 |
| 5,855,377 | * 1/1999 | Murphy | 279/50 |
| 5,860,775 | * 1/1999 | Sato et al. | 409/233 |
| 5,988,961 | * 11/1999 | Kameyama | 409/233 |
| 5,997,455 | * 12/1999 | Matsuoka et al. | 409/233 |

FOREIGN PATENT DOCUMENTS

379336 * 7/1973 (SU) ......................... 408/239 R

* cited by examiner

Primary Examiner—Williams Briggs
Assistant Examiner—Erica Ergenbright
(74) Attorney, Agent, or Firm—Bacon & Thomas, PLLC

(57) ABSTRACT

A device for clamping a knife of a machine center includes a kick member extends through a clamping member which is received in a sleeve. A knife is clamped by pawls extending from the clamping member and the sleeve has an annular flange to hold the pawls. Two bolts connected between the sleeve and the kick member via slots defined in the clamping member. The kick member is pushed by a pushing device which has a pressing member to push the kick member to disengage the annular flange from the pawls so that the knife is not securely held by the pawls and a knife switching arm can easily remove the knife from the pawls.

12 Claims, 8 Drawing Sheets

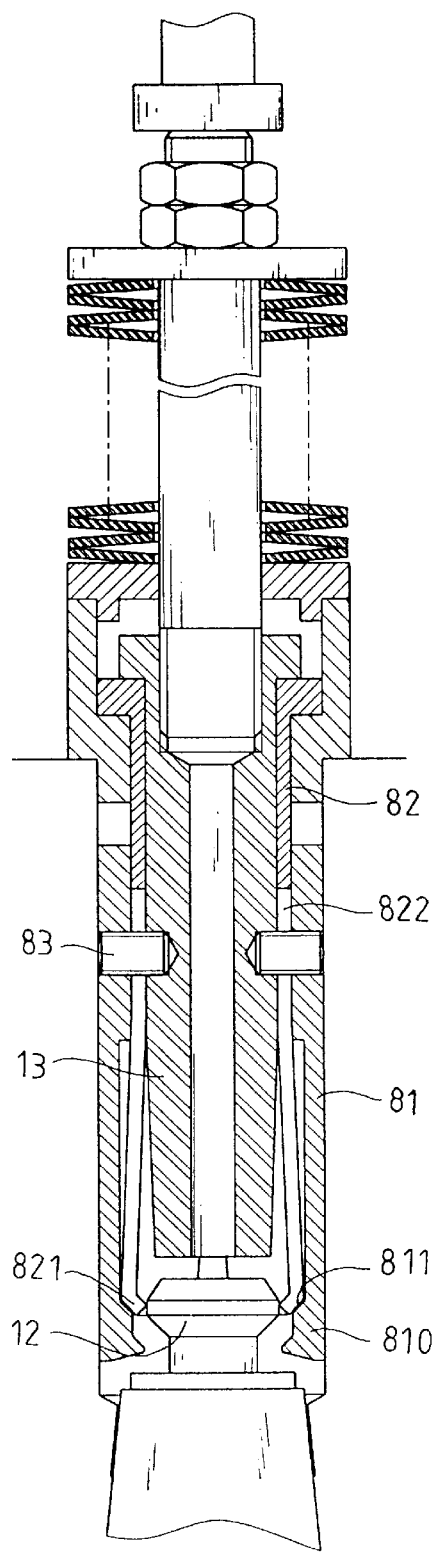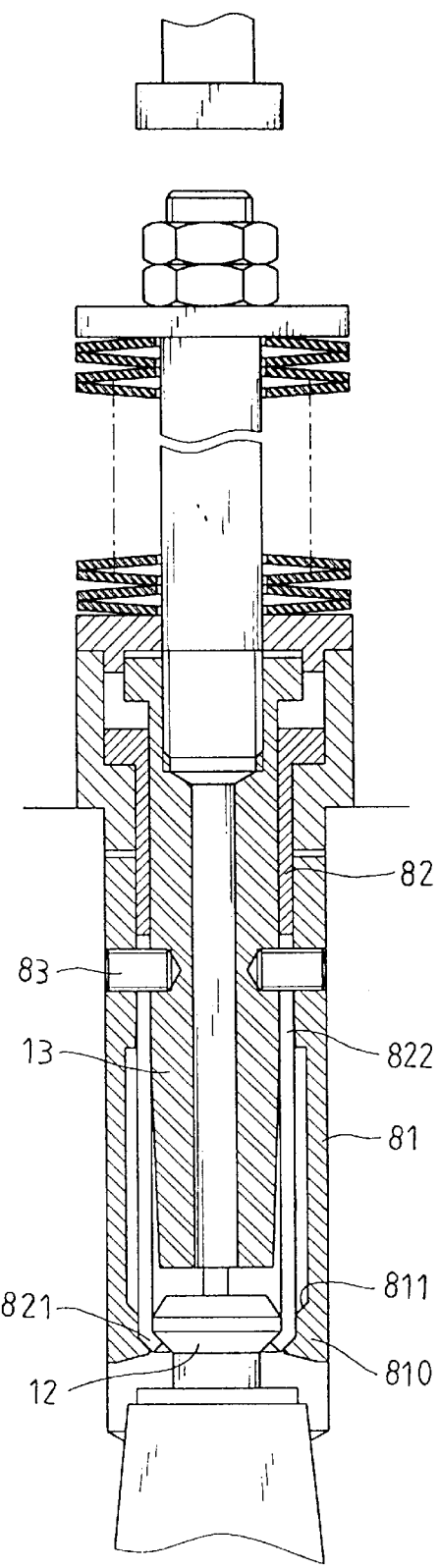
FIG.8                                   FIG.2

DEVICE FOR CLAMPING A KNIFE OF A MACHINE CENTER

FIELD OF THE INVENTION

The present invention relates to a device that has a clamping member with awls to hold the knife and the pawls are obtained by an annular flange of a movable sleeve mounted to the clamping member. When the movable sleeve is moved relative to the clamping member, the annular flange is disengaged from the pawls so that the knife can be removed from the pawls by a knife switching arm.

BACKGROUND OF THE INVENTION

A conventional knife replacement system of a machine center 10 is illustrated in FIG. 1, wherein a shaft 11 has a recess 110 defined in a lower end thereof so that a knife 12 is engaged with the recess 10. A kick member 13 is received in the shaft 11 and clamps the knife 12 by a clamping member 130. A main cylinder 14 exerts a force onto the kick member 130 and an auxiliary cylinder 15 is connected to the system of the main cylinder 14 so as to exert the kick member 13 a steady increment force so force the knife 12 to be disengaged from the recess 110. A knife switch arm (not shown) then pulls the knife 12 from the recess 110 and inserts a new knife 12 in the recess 110. However, it requires a huge force to the knife 12 from the two cylinders 14 and 15 so that the cost of the power is large. The knife 12 has to be maintained still to eliminate the expansion of heat of the knife so that the knife 12 can be easily removed from the recess 110. During the waiting period, the knife switch arm cannot do anything so that the time for replacing a new knife is long. Furthermore, when the cylinders exert a force to the kick member 13, the clamping member 130 is opened slightly so that the knife 12 could drop.

SUMMARY OF THE INVENTION

In accordance with one aspect of the present invention, there is provided a device for clamping a knife of a machine center and comprising a sleeve and a clamping member received therein. The clamping member has a plurality of pawls for holding a knife and the pawls are separated by slots. A kick member extends through the clamping member, and at least two bolts are respectively connected between the kick member and the sleeve via the two slots. The sleeve has an annular flange extending radially inward from a lower end thereof so as to be engaged with the pawls of the clamping member. A pushing means for pushing the kick member moves the sleeve member relative to the clamping member to disengage the annular flange from the pawls.

An object of the present invention is to provide a device that has a sleeve having annular flange which obtain the pawls of a clamping member so that when the sleeve is moved the pawls are loosened and the knife is conveniently replaced.

Another object of the present invention is to provide a device that employs a link mechanism to exert a force to the knife clamping member so as to disengage the knife from the clamping member.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 shows that the knife is held by pawls of a clamping member and the pawls is obtained by a sleeve mounted to the clamping member;

FIG. 8 shows that the pawls are loosened because the sleeve is lowered so that the knife is disengageable from the clamping member;

DETAILED DESCRIPTION OF THE PREFERRED EMBODIMENTS

Figure 1:
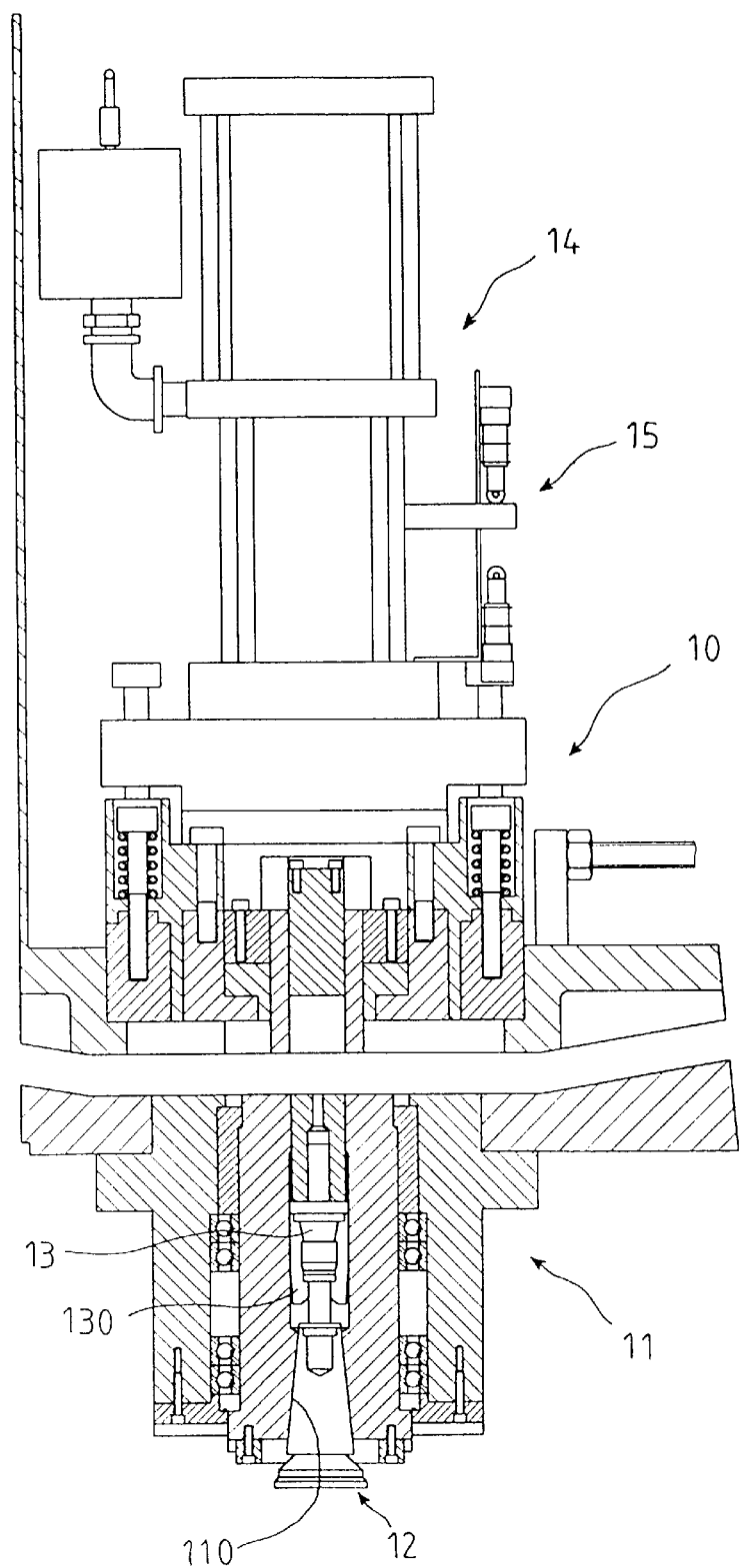
FIG. 1 is a cross-sectional view to show a conventional knife clamping device of a machine center.
Figure 3:
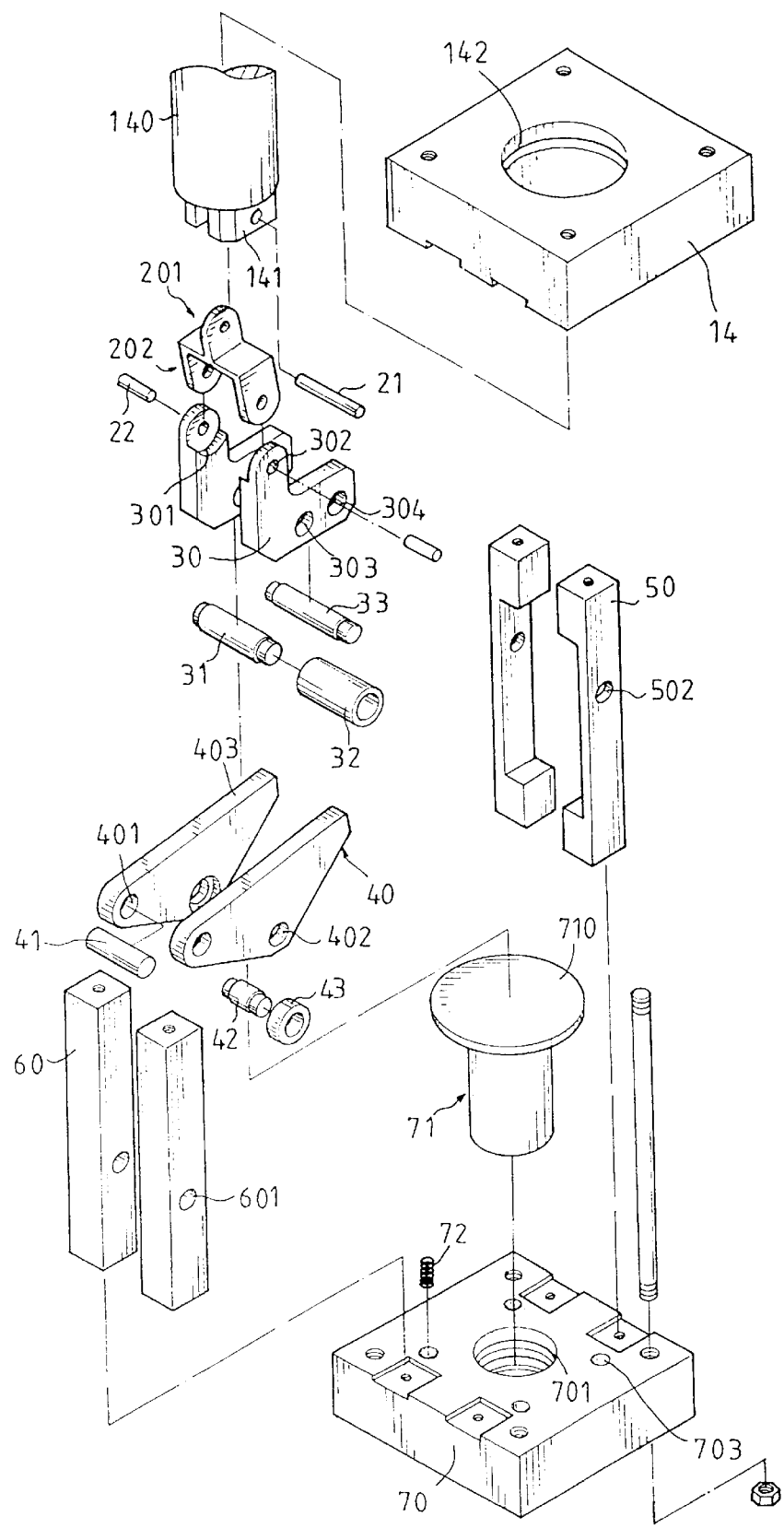
FIG. 3 is an exploded view to show the pushing means in accordance with the present invention.
Figure 4:
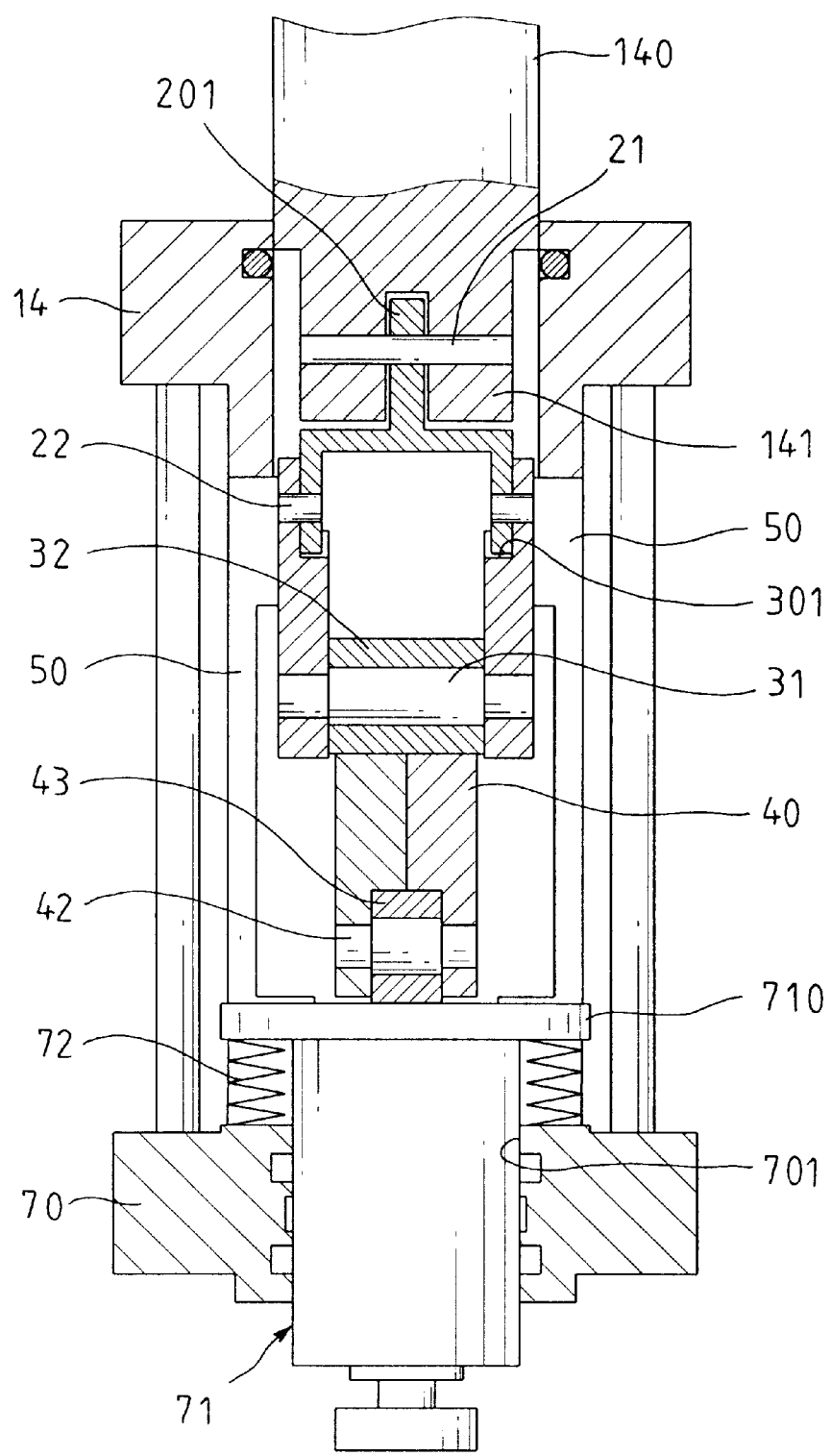
FIG. 4 is a cross-sectional view to show the assembly of the pushing means of the present invention.
Figure 5:
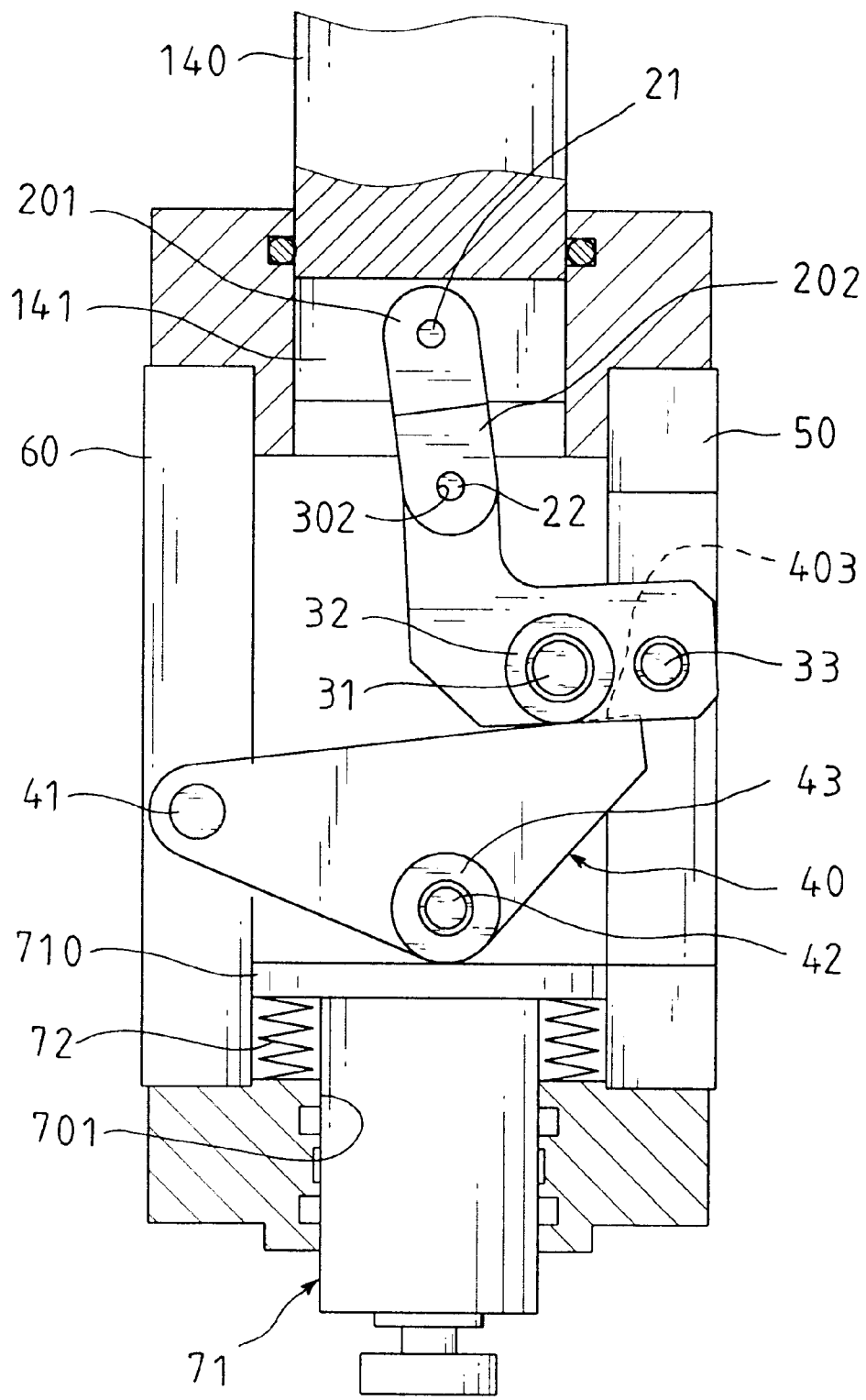
FIG. 5 shows when a cylinder of the pushing means is not yet moved downward to actuate the link mechanism and the pressing member of the device.

Referring to FIGS. 2 to 5, the device for clamping a knife of a machine center in accordance with the present invention comprises a sleeve 81 and a clamping member 82 received therein. The clamping member 82 has four pawls 821 (only two are shown) which are separated by four slots 822 and each pawl 821 has an inclined distal end so as to hold the knife 12. A kick member 13 extends through the clamping member 82 and at least two bolts 83 are respectively connected between the kick member 13 and the sleeve 81 via the two slots 822. The sleeve 81 has an annular flange 810 extending radially inward from a lower end thereof and the annular flange 810 has an inclined surface 811 so as to be engaged with an inclined outside of the pawls 821 of the clamping member 82. The kick member 13 is connected with springs on a top thereof.

A pushing means for pushing the kick member to move the sleeve 81 member relative to the clamping member 82. The pushing means includes a first frame 14 having a hole 142 and a second frame 70 having a hole 701. A first side composed of two columns 50 and a second side composed of two posts 60 are respectively connected between the first frame 14 and the second frame 70. A cylinder 140 movably extends through the hole 142 in the first frame 14 and has two plates 141 extending from a lower end thereof. A swing member 201 is pivotally connected between the two plates 141 of the cylinder 140 by a pin 21 and has two lugs 202. A link mechanism comprises two L-shaped plates 30 and each plate 30 has one end thereof pivotally connected to the lug 202 of the swing member 201. The other end of each L-shaped plate 30 is pivotally connected to the first side 50 by extending through apertures 502 in the two columns 50 and a hole 304 in each L-shaped plate 30. Each L-shaped plate 30 has a shoulder portion 301 so that the two lugs 202 are pivotally engaged with the shoulder portions 301. A rod 31 is connected between two holes 303 in the two L-shaped plates 30 and a first roller 32 is mounted to the rod 31 between the two L-shaped plates 30.

Two inverted triangle pressing plates 40 are pivotally connected between the two posts 60 of the second side 60 by extending a pin 41 through two holes in the two posts 60 and two holes 401 in the two pressing plates 40. A rod 42 is connected between two apertures 402 defined in a lower peak portion of the pressing plates 40 and a second roller 43 is mounted to the rod 42 between the two pressing plates 40. The first roller 32 is movable on the top side 403 of each of the pressing plates 40. A pressing member 71 movably extends through the hole 701 of the second frame 70 and the pressing member 71 has a flange 710 extending radially outward therefrom so that two springs 72 are biased between the flange 710 and two notches 703 in the second frame 70. The second roller 43 rotatably contacts the pressing member 71.

Figure 6:
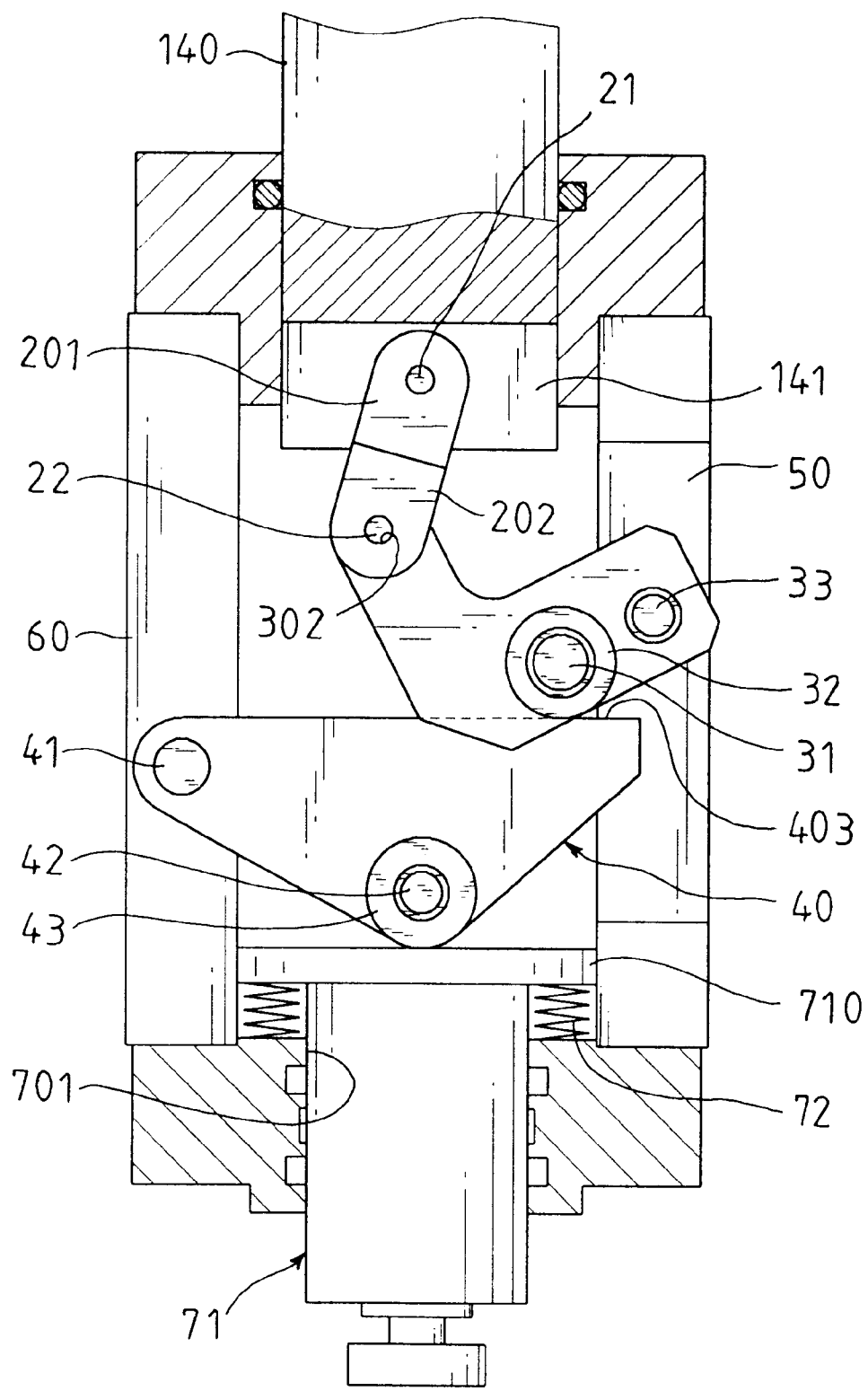
FIG. 6 shows when the cylinder of the pushing means is moved downward to push the pressing member of the device.
Figure 7:
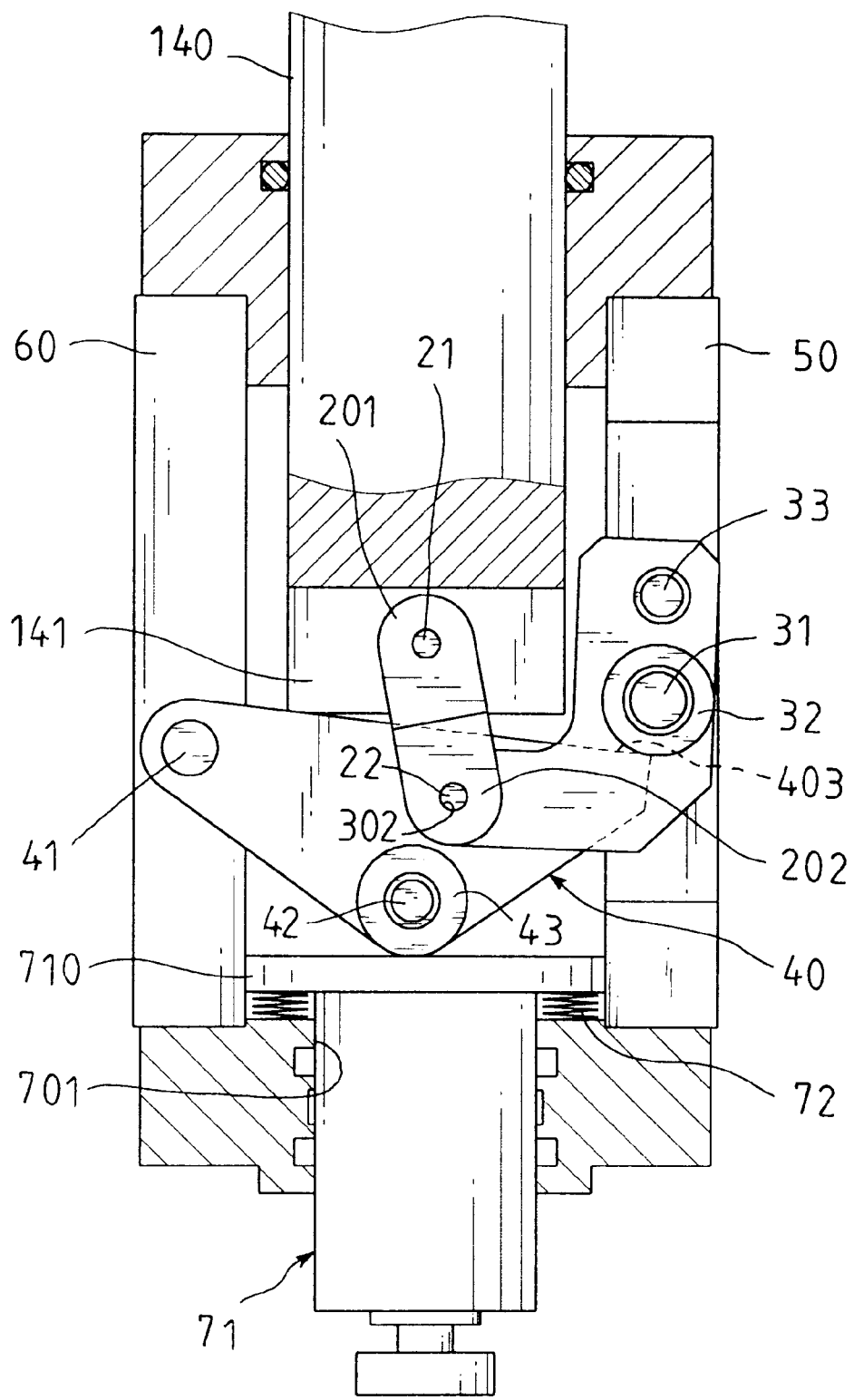
FIG. 7 shows that the link mechanism of the pushing means is moved to the lowest position so that the pressing member is moved to press the kick member.

Referring to FIGS. 6, 7 and 8, when the cylinder 140 moves toward the link mechanism, the two L-shaped plates 30 are pivoted and the first roller 32 pushes the pressing plates 40 downward so that the pressing member 71 is pushed to move the kick member 13 together with the sleeve 81 downward. The clamping member 82 is maintained still when the sleeve 81 is moving, so that the annular flange 810 is disengaged from the pawls 821 as shown in FIG. 8. The lower end of the kick member 13 is then lowered to contact an upper end of the knife 12. When the annular flange 810 is disengaged from the pawls 821, the knife 12 is still held by the pawls 821 and will not drop. Accordingly, when a knife switching arm (not shown) catches the knife 12, the knife 12 can be easily removed from the pawls 821.

The device replaces the knife 12 fluently and the knife switching arm needs no waiting period so that the efficiency is increased. During the downward pushing process of the kick member 13, the knife 12 is still held by the pawls 821 so that the knife 12 will never drop before the knife switch arm come to catch it.

Figure 9:
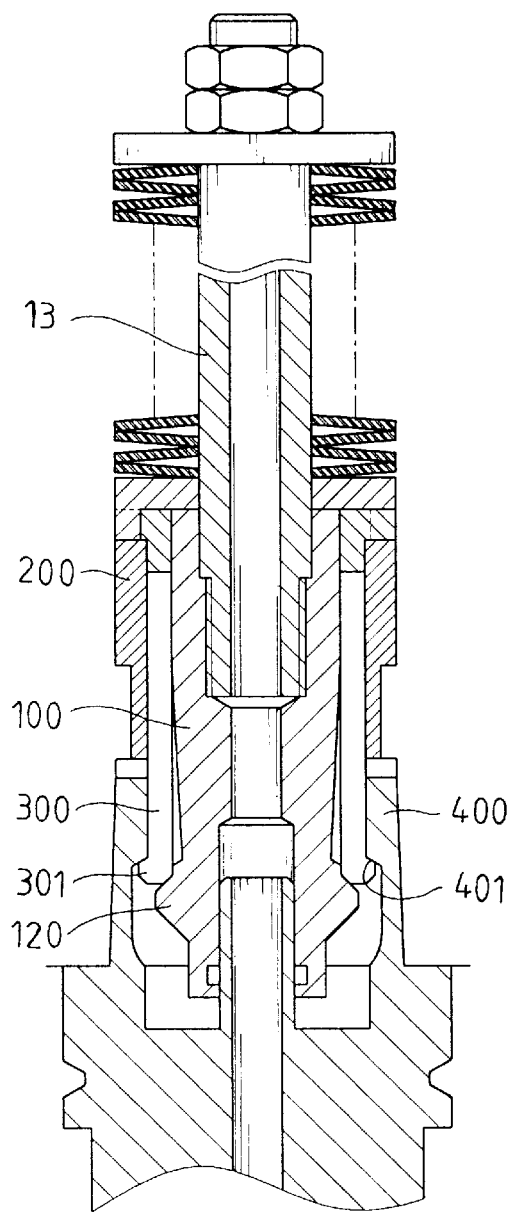
FIG. 9 shows another embodiment of the clamping device wherein the knife is not yet disengaged from the pawls of the clamping member.
Figure 10:
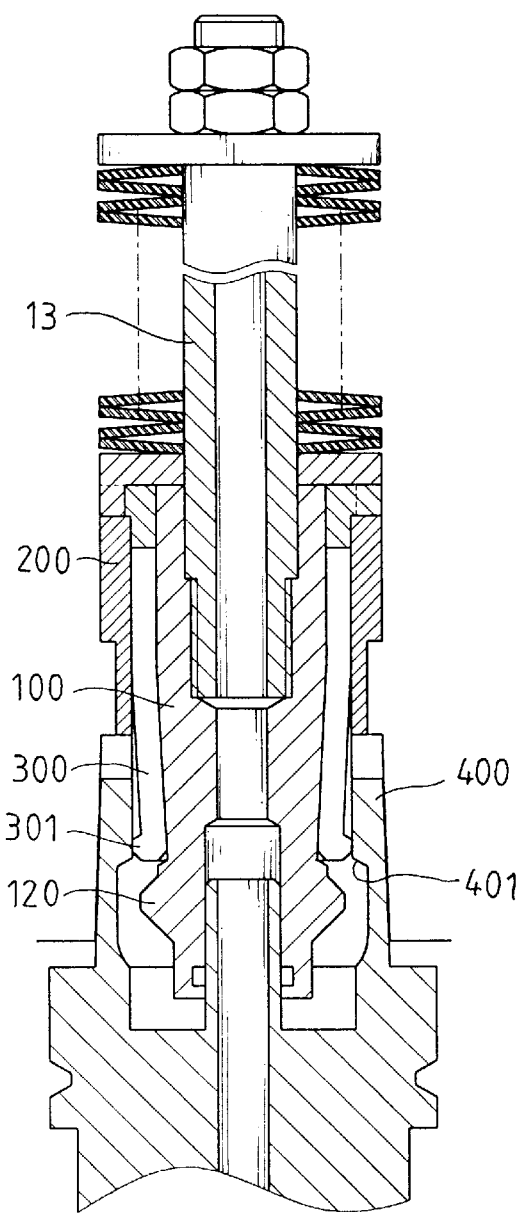
FIG. 10 shows that the pawls are loosened and the knife is disengageable from the pawls of the clamping member.

FIGS. 9 and 10 show another embodiment of the device and comprises a rod 100 having a flange 120 extending radially outward therefrom and a movable kick member 13 connected to the rod 100. A sleeve 200 is mounted to the rod 100 and an annular gap is defined between the sleeve 200 and the rod 100. A plurality of pawls 300 are securely located in the annular gap and each pawl 300 has a boss 301 extending radially outward from a distal end thereof. The bosses 301 are engaged with a shoulder portion 401 defined in an inside of a knife set 400. The pawls 300 are opened outward to securely engage with the shoulder portion 401 of the knife set 400 when the boss 301 of each pawl 300 are engaged with an outside of the flange 120 as shown in FIG. 9. When the rod 100 is moved away from the pawls 300 by a pushing means as described for FIGS. 3 to 7, the kick member 13 is lowered and moved away from the sleeve 200 as shown in FIG. 10, so that the flange 120 is disengaged from the pawls 300 so that the bosses 301 are disengaged from the shoulder portion 401 of the knife set 400 and the knife set 400 is easily removed.

While we have shown and described various embodiments in accordance with the present invention, it should be clear to those skilled in the art that further embodiments may be made without departing from the scope and spirit of the present invention.

What is claimed is:

1. A device for clamping a knife of a machine center, comprising:
   a sleeve having a clamping member received therein and said clamping member having a plurality of pawls, said pawls separated by slots, a kick member extending through said clamping member and at least two bolts connecting said kick member and said sleeve via said slots, said sleeve having an annular flange extending from an end thereof so as to be engaged with said pawls of said clamping member, and
   a pushing means for pushing said kick member to move said sleeve relative to said clamping member to disengage said annular flange from said pawls, wherein said pushing means includes a first frame and a second frame, a first side member and a second side member connecting said first frame and said second frame, a cylinder movably extending through said first frame and a swing member pivotally connected to an end of said cylinder, two L-shaped plates each having one end thereof pivotally connected to said swing member, the other end of each L-shaped plate pivotally connected to said first side member and a first roller connecting said two L-shaped plates;
   two pressing plates pivotally connected to said second side member and a second roller connecting said two pressing plates, said first roller rotatably contacting said pressing plates, and
   a pressing member movably extending through said second frame and said second roller contacting said pressing member, said pressing member pushing said kick member.

2. The device as claimed in claim 1, wherein said pressing member has a flange at one end, and a spring is biased between said flange and said second frame.

3. The device as claimed in claim 1, wherein said swing member has two lugs and each L-shaped plate has a shoulder portion, said two lugs pivotally connected to said two L-shaped plates and rotatably engaged with said shoulder portions.

4. The device as claimed in claim 1, wherein each pressing plate is an inverted triangle plate and said second roller is located at an apex of each pressing plate.

5. The device as claimed in claim 1, wherein said first side member includes two columns and said two L-shaped plates pivotally connect said two columns.

6. The device as claimed in claim 1, wherein said second side member includes two posts and said two pressing plates pivotally connect said two posts.

7. A device for clamping a knife of a machine center, comprising:
   a rod having a flange extending radially outward therefrom and a movable kick member connected to said rod;
   a sleeve mounted to said rod and an annular gap defined between said sleeve and said rod,
   a plurality of pawls securely located in said annular gap and each pawl having a boss extending outward from an end of the pawl, said pawls opening outward when each boss of each pawl is engaged with an outside of said flange, said bosses disengaged from said flange when said rod is moved away from said pawls, and
   a pushing means for pushing said kick member away from said sleeve wherein said pushing means includes a first frame and a second frame, a first side member and a second side member connecting said first frame and said second frame, a cylinder movably extending through said first frame and a swing member pivotally connected to an end of said cylinder, two L-shaped plates each having one end thereof pivotally connected to said swing member, the other end of each L-shaped plate pivotally connected to said first side member and a first roller connecting said two L-shaped plates;
   two pressing plates pivotally connected to said second side member and a second roller connecting said two pressing plates, said first roller rotatably contacting said pressing plates, and a pressing member movably extending through said second frame and said second roller contacting said pressing member, said pressing member pushing said kick member.

8. The device as claimed in claim 7, wherein said pressing member has a flange at one end, and a spring is biased between said flange and said second frame.

9. The device as claimed in claim 7, wherein said swing member has two lugs and each L-shaped plate has a shoulder portion, said two lugs pivotally connected to said two L-shaped plates and rotatably engaged with said shoulder portions.

10. The device as claimed in claim 7, wherein each pressing plate is an inverted triangle plate and said second roller is located at an apex of each pressing plate.

11. The device as claimed in claim 7, wherein said first side includes two columns and said two L-shaped plates pivotally connect said two columns.

12. The device as claimed in claim 7, wherein said second side includes two posts and said two pressing plates pivotally connect said two posts.

\* \* \* \* \*